United States Patent Office 3,044,589
Patented July 17, 1962

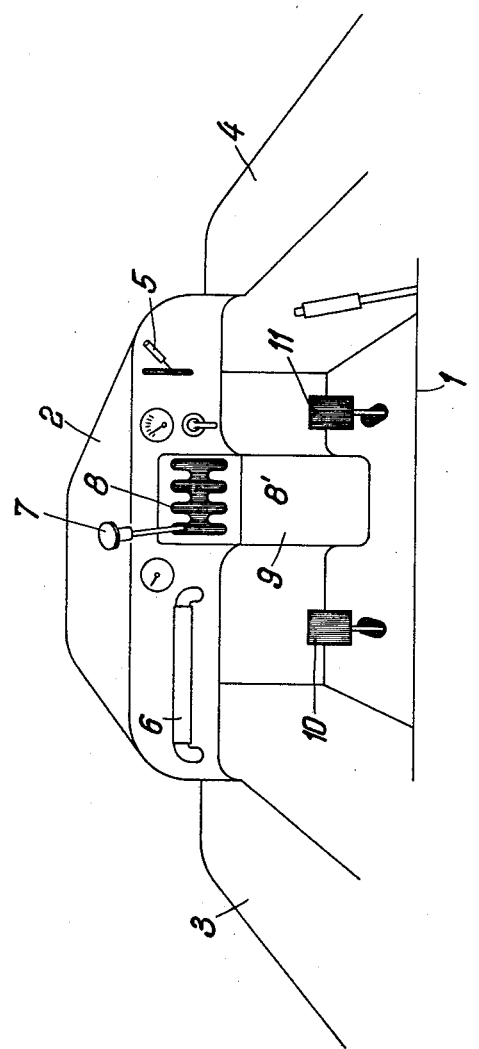

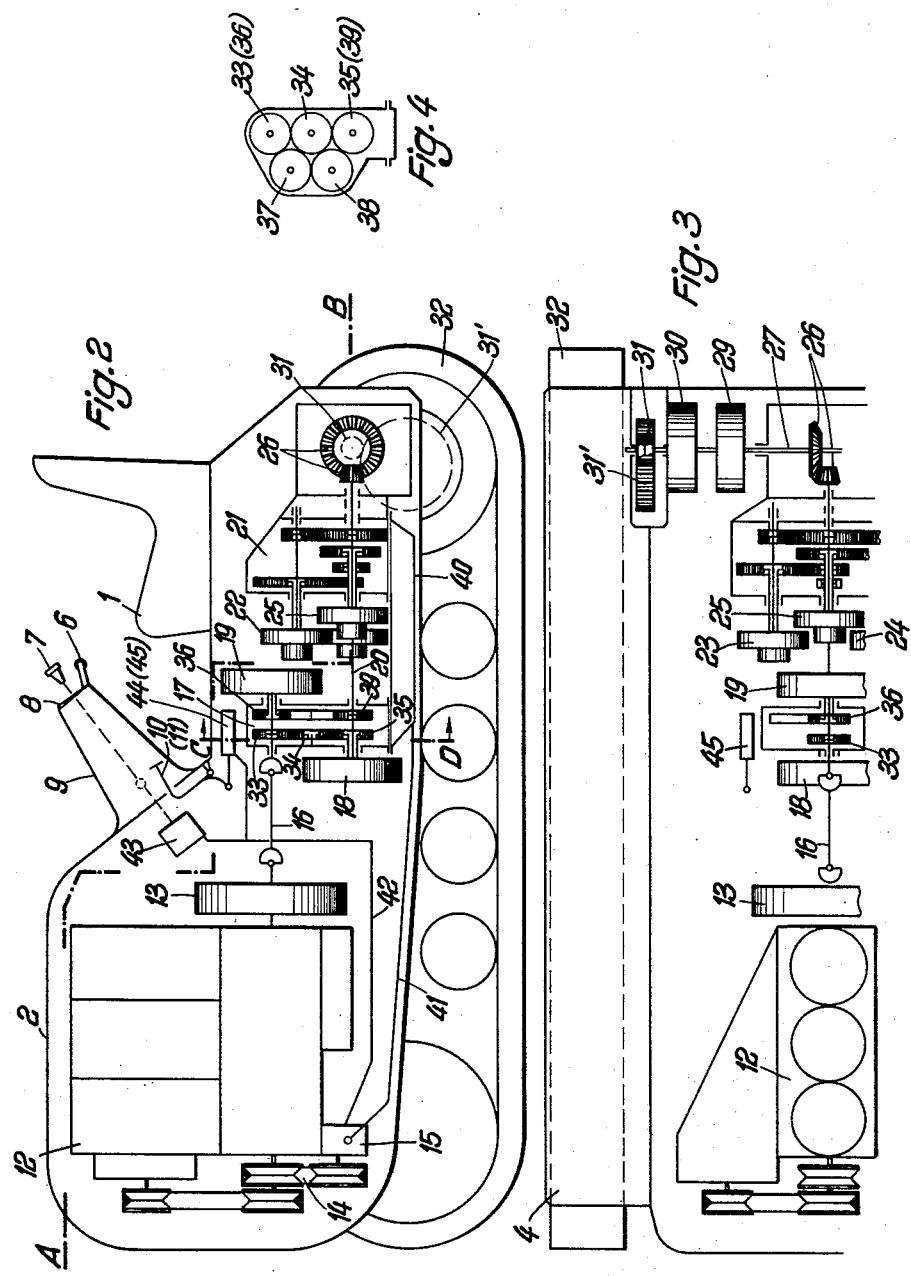

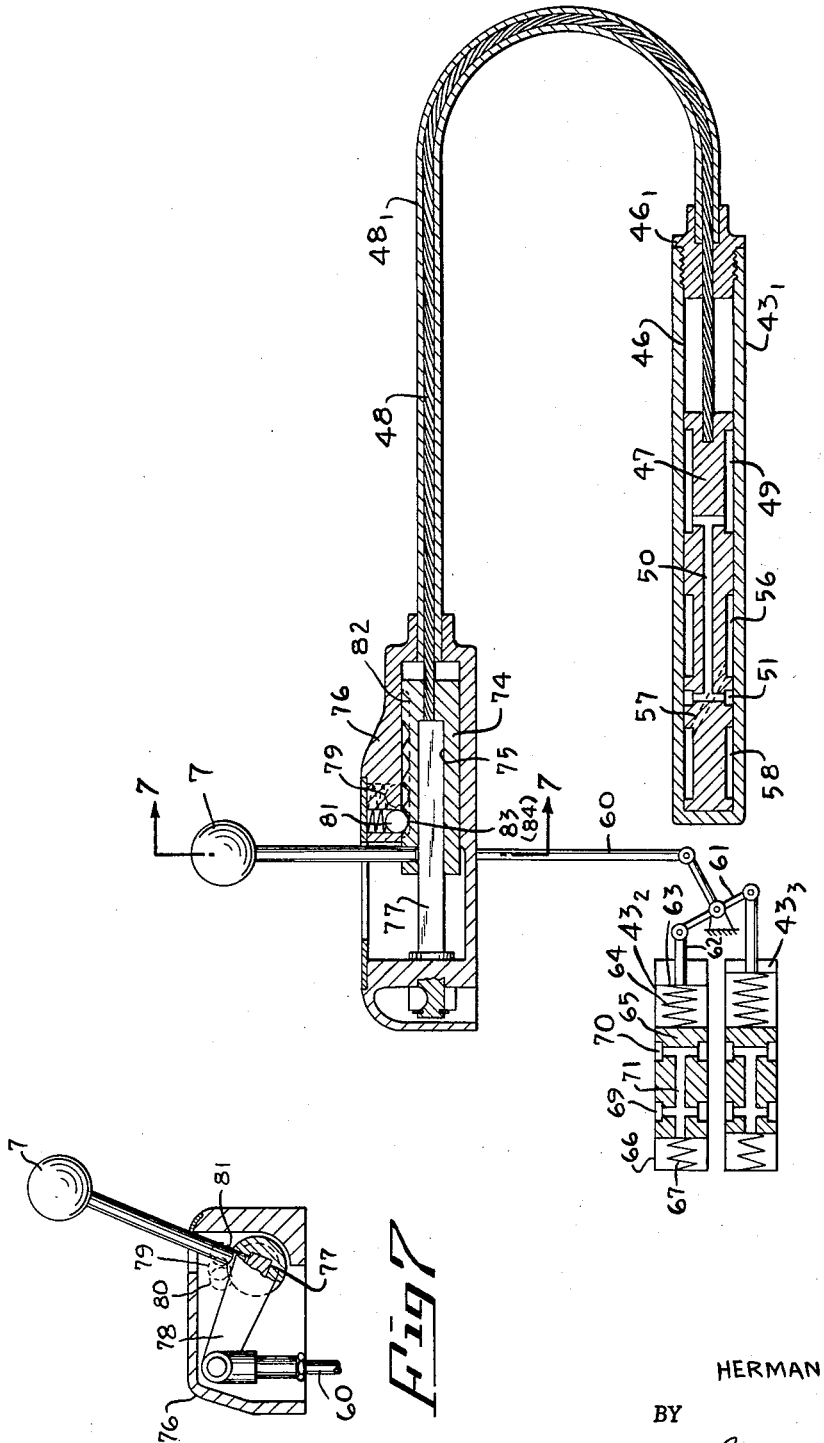

3,044,589
TRACK-LAYING VEHICLE HAVING A HYDRAULICALLY OPERATED CLUTCH-SHIFTED AND REVERSING TRANSMISSION
Hermann Klaue, Christophstr. 19, Uberlingen (Bodensee), Germany
Filed Mar. 13, 1959, Ser. No. 802,591
Claims priority, application Germany Mar. 14, 1958
3 Claims. (Cl. 192—3.5)

It is an object of this invention to reduce the large number of levers and pedals required for the clutch-shifted, reversing and steering transmissions of track-laying vehicles and to reduce the steering forces required to operate the steering clutches and steering brakes.

In track-laying vehicles which are steered by means of clutches and brakes, servo-assistance has been provided to reduce at least the steering forces required to actuate the steering clutch and steering brake, with a view to reducing driver fatigue. Hydrodynamic transmissions have also been provided to reduce shifting.

Extra servo-equipment is of complicated construction, expensive and easily disturbed, and all the more so if fitted subsequently. Hydrodynamic transmissions, even though they have proved satisfactory for many purposes, are of doubtful value for track-laying vehicles, for a normal catepillar tractor fitted with a hydrodynamic converter still requires three gear speeds for satisfactory operation of the vehicle over the whole speed range. As in conventional designs, these gear speeds and the extra reversing transmission required must be operated by clutching and shifting, so that the provision of hydrodynamic converters does not really simplify driving. Another disadvantage associated with hydrodynamic converters is that they are more expensive than a conventional shifting transmission and extra cooling means are required, entailing hoses and pipes which are easily disturbed.

The invention obviates the above disadvantages. To solve the problem, according to the present invention the hand lever serving to operate the hydraulic control device of the clutch-shifted and reversing transmission is moved perpendicularly to the lengthwise axis of the vehicle to engage the various steps of the shifting transmission, and lengthwise of said axis to engage the forward or reverse clutches of the reversing transmission. Of course, the control device could be operated pneumatically.

The clutches and brakes should be of the dry disc kind, to obviate an abrupt change in friction when the clutches or brakes are engaged. A disadvantage of oil-immersed disc clutches is that their engagement with one another starts softly but, as the oil is squeezed out from between the discs, the friction between the discs increases abruptly and the clutches snatch. If all the clutches and brakes are operated from a pressure medium source, the vehicle can be controlled by means of a single lever for the shifting and reversing transmission and two pedals for the hydraulic or pneumatic steering transmission. As seen by the driver, the left pedal is for left turns and the right pedal is for right turns.

The invention is illustrated by way of example in the accompanying drawings.

FIGURE 1 is a perspective view, looking towards the front, from the driver's position on a caterpillar tractor. The reference 1 denotes the front edge of the driver's seat and the reference 2 denotes the engine bonnet. The references 3, 4 denote the lateral chain covers and the reference 5 denotes an accelerator lever for controlling the engine governor. The driver can hold on to the bar 6 with his left hand while with his right hand he operates the shift lever 7. The same is movable in two planes in the gate 8 of the shift-lever dust-cover 9. As can be seen in FIGURE 1, the gate 8 is formed with four forwardly and upwardly extending recesses and with four rearwardly and downwardly extending recesses in which the lever 7 is guided. In the centre the recesses extending lengthwise of the vehicle are interconnected by a transverse recess 8'.

The clutch-shifted transmission has four gear speeds which the reversing transmission enables to be used for both directions of travel. In FIGURE 1 the lever 7 is in the position corresponding to first forward speed. To shift, for instance, from first to third forward speed, the driver first moves the lever 7 back and down to disengage, in a manner to be explained hereinafter, the forward clutch of the reversing transmission, whereafter he moves the lever 7 in the transverse recess 8' as far as the third lengthwise recess, to change over the shifting clutches of the clutch-shifted transmission, and then moves the lever 7 forward to re-engage the forward clutch of the reversing transmission, the speed of engagement of the clutch depending upon the speed at which the driver moves the lever 7 lengthwise. Pedals 10, 11 are for steering the vehicle.

The foregoing description of FIGURE 1 shows that in the solution of the problem according to the invention operation of the vehicle is organic and consequential, in contrast to the arrangement of the control elements in known track-laying vehicles. For travel forwards the lever 7 is moved forwards and for reverse the lever 7 is moved backwards, and for a gentle start the lever 7 is moved correspondingly slowly. To turn the vehicle to the left, the driver operates the left pedal, and to turn it to the right he operates the right pedal.

An embodiment of the track-laying vehicle according to the invention is diagrammatically illustrated in FIGURES 2 and 3, FIGURE 2 illustrating a sectional elevation and FIGURE 3 illustrating half a sectional plan view.

FIGURE 4 is a cross-section through the reversing transmission;

FIGURE 5 diagrammatically illustrates the pressure medium operation of the reversing and shifting transmission.

FIG. 6 is a sectional view showing the shift system; and

FIG. 7 is a fragmentary sectional view taken on the line 7—7 of FIG. 6.

Figure 5:
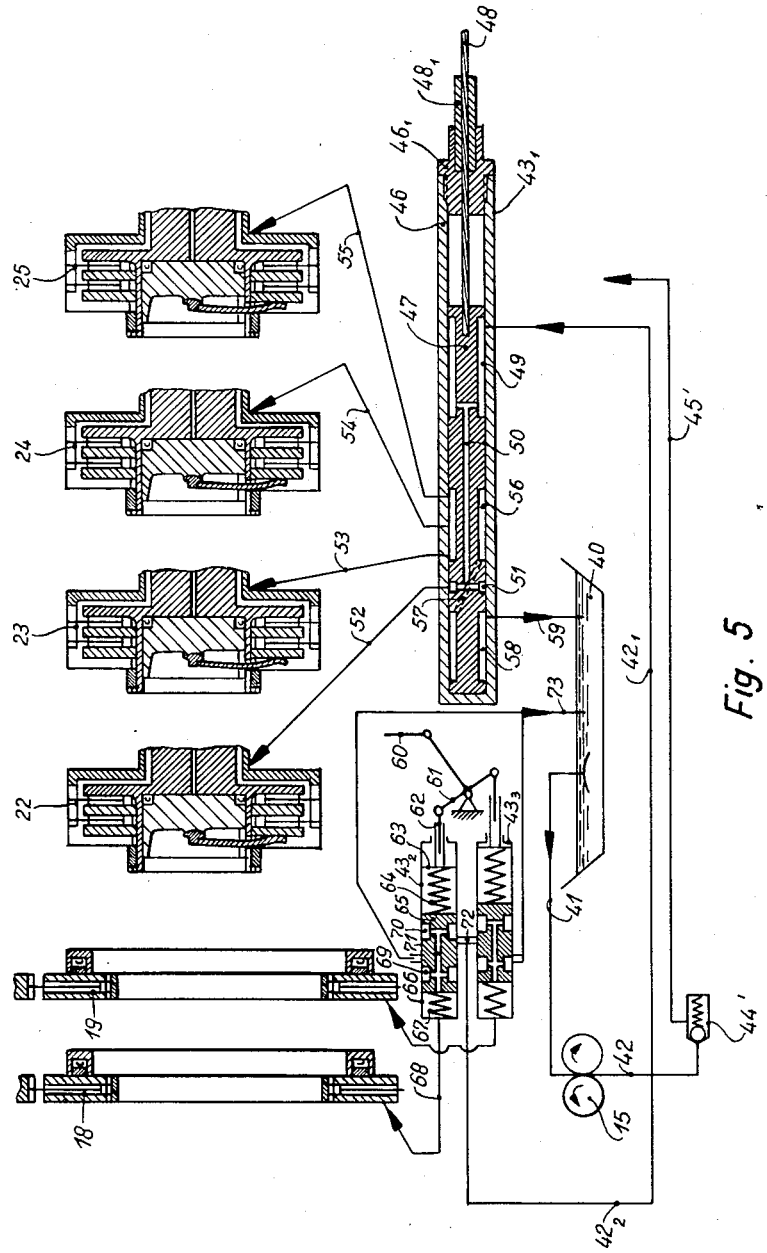

The driver's seat and control elements have the same references as in FIGURE 1. An engine 12 having a flywheel 13 drives a front-end oil pump 15 through a belt drive 14 and also drives, through an articulated shaft 16, a reversing transmission 17 comprising a forward clutch 18 and a reverse clutch 19. The clutches 18, 19 are dry disc clutches which are hydraulically or pneumatically operated.

Through an intermediate shaft 20 a stepwise change-speed gearbox 21 is driven by way of dry and pressure-medium-operated shifting clutches 22, for 1st gear, 23, for 2nd gear, 24, for third gear, and 25, for fourth gear or direct drive. The engine torque is transmitted from the gearbox through bevel gearing 26 to a countershaft 27 which has on each side a dry and pressure-medium-operated disc clutch 29, 30 for steering. A pinion 31 drives a chain 32 by way of spur gears 31'.

For forward and reverse shifting in the reversing transmission, three intermediate wheels 33–35 are engaged for forward travel and four intermediate wheels 36–39 are engaged for reverse travel, as can be seen in FIGURE 4. In the embodiment illustrated the reversing and shifting transmissions are interconnected by an oil sump 40 from which the oil pump 15 draws oil through a duct 41 and delivers pressure oil through a pipe 42 to control devices such as a distributing valve 43 of the reversing and shifting transmission and to the control valves 44, 45 of the steering brakes and clutches.

The pressure medium circuit of the reversing and shifting transmission is diagrammatically illustrated in FIGURE 5. For the sake of clarity in the drawing, the control device 43 diagrammatically indicated in FIGURE 2 and serving for central control of the clutches of the reversing and clutch-shifted transmission is shown broken down into its various elements. In FIG. 2 there is shown by a broken line a connection between the lever 7 and the control devices 43 indicating the control exercised by means of the lever 7 on the forward and reverse clutches 18 and 19. Through a duct $42_1$ pressure oil reaches a control device $43_1$ which shifts the four shifting clutches 22–25; through a duct $42_2$ pressure oil reaches two control valves $43_2$, $43_3$ for operating the clutches 18, 19 of the reversing transmission. Surplus oil delivered by the gear pump 15 flows away through a spring-loaded safety valve 44' and duct 45'. Conveniently, the oil is used to lubricate the clutch oil supply rings and the transmissions.

The control device $43_1$ comprises a cylindrical casing 46 in which a control slide valve 47 is moved by a Bowden cable 48 which is operatively connected to the shift lever 7 (not shown in FIGURE 5). The outer covering $48_1$ of the Bowden cable is rigidly secured to closure plug $46_1$ in the cylinder 46.

When the valve 47 is in the position shown in FIGURE 5, pressure oil is supplied to the shifting clutch 22 associated with first gear. The pressure oil supplied by the pump 15 passes through a bore (not shown) perpendicular to the axis of the cylinder 46 into an annular chamber 49. From the same the oil flows through an axial bore 50 into an annular chamber 51 which, when the valve 47 is in the position shown in FIGURE 5, communicates with a duct 52 extending to the shifting clutch 22. A duct 53 associated with the shifting clutch 23, a duct 54 associated with the shifting clutch 24 and a duct 55 associated with the shifting clutch 25 are connected to an annular chamber 56 of the valve 47. The chamber 56 communicates through a bore 57 with an annular chamber 58 which is always in communication with the oil sump 40 by way of a duct 59. Hence when the valve 47 is in the position shown in FIGURE 5, no pressure is applied to the clutches 23–25.

When the valve 47 is moved axially, the narrow annular duct 51 connects the oil supply to the bores of the various supply ducts 53–55 to operate the associated clutch. For instance, when the annular duct 51 is connected to the duct 53, oil flows from the clutch 22 through the duct 52 directly into the annular duct 58 and thence through the duct 59 into the sump 40. The ducts 54, 55 remain in communication with the sump 40 by way of the annular duct 56, bore 57, annular duct 58 and duct 59. Hence when the valve 47 is moved, only one shifting clutch is supplied with oil at a time.

Whereas the shifting clutches of the clutch-shifted transmission are supplied at full pump pressure when engaged, the oil pressure applied to the reversing clutches 18, 19 through the control valve $43_2$, $43_3$ can be varied. In FIGURE 5 the valves are shown in the position for engagement of first forward gear, corresponding to the position of the shift lever 7 shown in FIGURE 1.

Since the two control valves $43_2$, $43_3$ shown one above another are of identical construction, only one of them need be described and given references. In the example illustrated the control valves $43_2$, $43_3$ are operated by a rocker 61 acting through linkage 60. The linkage 60, which is indicated only schematically in FIG. 5, is connected to the lever 7 by a connecting means, such as a lever 78, so that when the lever 7 is moved up or down (FIG. 1), the linkage 60 will accordingly be moved up or down, thereby moving the rocker 61 correspondingly. The rocker 61 acts through a thrust rod 62 to operate a pressure cup 63 and through a compression spring 64 to operate a control slide valve 65 bearing against the base of the cylinder 66 by way of another compression spring 67. The space below the control slide valve 65 where the compression spring 67 is disposed communicates through a duct 68 with the reversing clutch 18.

The valve 65 is formed with two annular grooves 69, 70 communicating through transverse bores and a lengthwise bore 71 with the space below the control piston. Pressure oil is supplied from the duct $42_2$ through the transverse bore 72 to the control valve, while the oil issuing from the control valve during control flows away back to the sump 40 through a return duct 73.

When the compression spring 64 is stressed, there is produced in the space below the control valve and therefore in the associated reversing clutch a pressure which corresponds to the resultant spring force of the two compression springs 64, 67, for the reason that the two annular grooves 69, 70 restrict the inflow through the duct 72 and the outflow through the duct 73. The two facing control edges of the annular grooves 69, 70 reciprocate between the inflow and outflow ducts. When the pressure of the spring 64 ceases—i.e., when the linkage 61 moves back—pressure oil is removed from the clutch 18 by way of the duct 68, bore 71, annular duct 69 and 73. During operation of the control valve of one reversing clutch the control valve of the other reversing clutch remains open.

The shift lever 7 may be rocked forwards and backwards about the axis of a shaft 77, to actuate respectively the advancing and reversing movement of the vehicle. By rocking the lever 7 with the shaft 77, the lever 78 transmits that rocking movement to the linkage 60 (FIGS. 5, 6, 7). The lever 7 may also be shifted laterally of FIG. 6, to change thereby the distance between the outer covering $48_1$ of the Bowden cable 48 and the connection of the cable 48 on the shaft 77 of square cross-section (FIGS. 5 and 6).

The operation of the reversing and clutch-shifted transmission just described will be briefly explained with reference to FIGURES 2–4. During forward travel of the track-laying vehicle the engine 12 having the flywheel 13 drives the articulated shaft 16 through gears 33–35 of the reversing transmission and through the dry disc clutch 18 of the clutch-shifted transmission 21. In the embodiment illustrated the same has four speeds and four shifting clutches 22–25. In the 4th speed pressure oil is supplied to the shifting clutch 25 which can conveniently be a multiple-disc clutch. Power is then transmitted by the clutch 25 directly to the bevel gears 26 and thence to the axle drive.

For engagement of the other speeds of the transmission the appropriate clutches are supplied with pressure oil. For reverse travel the pressure is removed from the clutch 18; instead, the reverse clutch 19 is supplied with pressure oil. In this case the drive is by way of the gears 33, 37, 38 and 35 to the input shaft 20 of the transmission 21 and rotation is to the opposite hand.

I claim:
1. In a track-laying vehicle, a forward and reverse drive mechanism comprising transmission gears, hydraulically operated clutches for said gears including a first main clutch for advancing, a second main clutch for reversing, and a series of transmission clutches connected to said gears, hydraulic control means for said clutches comprising hydraulic pressure conduits including a first main valve connected to said first main clutch, a second main valve connected to said second main clutch, a distribution valve connected to said transmission clutches, and a hand lever actuatable to operate said hydraulic control means and being in driving connection with said main valves and movable in opposite directions forwardly and rearwardly in one plane thereby energizing either main valve, for vehicle advancing and reversing, respectively, and being in driving connection with said distribution valve and movable in a second plane at an angle to said one plane thereby selectively energizing a transmission clutch.

2. In a track-laying vehicle as claimed in claim 1, said transmission clutches including dry disc clutches.

3. In a track-laying vehicle as claimed in claim 1, together with a hydraulic steering transmission including dry disc steering clutches and brakes, and two pedals one on each side relative to the driver operatively connected to said steering clutches and brakes, the left side pedal being used for left turns and the right side pedal for right turns.

References Cited in the file of this patent
UNITED STATES PATENTS

| | | |
|---|---|---|
| 1,788,899 | Tenney | Jan. 13, 1931 |
| 2,025,513 | Johnston | Dec. 24, 1935 |
| 2,399,613 | Backus et al. | May 7, 1946 |
| 2,804,780 | Gerst | Sept. 3, 1957 |
| 2,866,350 | Gerst | Dec. 30, 1958 |
| 2,866,360 | Gerst | Dec. 30, 1958 |
| 2,917,941 | Wittren | Dec. 22, 1959 |